United States Patent
Jo et al.

(10) Patent No.: US 11,746,165 B2
(45) Date of Patent: Sep. 5, 2023

(54) METHOD FOR PREPARING POLYBUTENE OLIGOMER

(71) Applicant: LG Chem, Ltd., Seoul (KR)

(72) Inventors: Dong Hyun Jo, Daejeon (KR); Jin Lee, Daejeon (KR); Won Hee Kim, Daejeon (KR); Gyeong Shin Choi, Daejeon (KR)

(73) Assignee: LG Chem, Ltd.

( * ) Notice: Subject to any disclaimer, the term of this patent is extended or adjusted under 35 U.S.C. 154(b) by 712 days.

(21) Appl. No.: 16/960,696

(22) PCT Filed: Oct. 30, 2019

(86) PCT No.: PCT/KR2019/014453
§ 371 (c)(1),
(2) Date: Jul. 8, 2020

(87) PCT Pub. No.: WO2020/105891
PCT Pub. Date: May 28, 2020

(65) Prior Publication Data
US 2020/0354489 A1 Nov. 12, 2020

(30) Foreign Application Priority Data
Nov. 23, 2018 (KR) .................. 10-2018-0145928

(51) Int. Cl.
*C08F 110/10* (2006.01)
*C07F 5/02* (2006.01)

(52) U.S. Cl.
CPC ............ *C08F 110/10* (2013.01); *C07F 5/027* (2013.01)

(58) Field of Classification Search
CPC .............................. C08F 110/10; C07F 5/027
See application file for complete search history.

(56) References Cited

U.S. PATENT DOCUMENTS

| | | |
|---|---|---|
| 2002/0045790 A1 | 4/2002 | Stibrany et al. |
| 2003/0088135 A1 | 5/2003 | Yun et al. |
| 2005/0107551 A1 | 5/2005 | Lang et al. |
| 2008/0221285 A1 | 9/2008 | Walter et al. |
| 2008/0249267 A1 | 10/2008 | Hanefeld et al. |

FOREIGN PATENT DOCUMENTS

| | | | |
|---|---|---|---|
| CN | 101282785 | A | 10/2008 |
| CN | 103596686 | A | 2/2014 |
| EP | 3653298 | A1 | 5/2020 |
| JP | 2005519155 | A | 6/2005 |
| KR | 100486044 | B1 | 4/2005 |
| KR | 20080044870 | A | 5/2008 |
| KR | 101233924 | B1 | 2/2013 |
| KR | 20190110957 | A | 10/2019 |
| KR | 20200077109 | A | 6/2020 |
| WO | 2012170202 | A2 | 12/2012 |

OTHER PUBLICATIONS

Ahmed K. Hijazi et al., Molybdenum(III) Compounds as Catalysts for 2-Methylpropene Polymerization, Angewandte Chemie International Edition, Published Online Jun. 2007, pp. 7290-7292, vol. 46, No. 38.
Bernd E. Diebl et al., Synthesis and Application of Molybdenum (III) Complexes Bearing Weakly Coordinating Anions as Catalysts of Isobutylene Polymerization, Journal of Polymer Science Part A: Polymer Chemistry, 2010, pp. 3775-3786, vol. 48.
F. Albert Cotton et al., Synthesis and Characterization of Octakis(acetonitrile)dimolybdenum(II) Tetrafluoroborate, Inorganic Chemistry, 1991, pp. 871-873, vol. 30.
Fritz E. Kuhn et al., Solvent stabilized transition metal cations as initiators for cyclopentadiene polymerization, Macromolecular Rapid Communications, 1999, pp. 555-559, vol. 20, No. 10.
Guofang Zhang, Synthesis and Characterization of Metal-Metal Multiply Bonded Complexes and Catalytic Applications of Solvent Stabilized Transition Metal Complexes for Polymerization of Olefins, Dissertation, Technischen Universitat München, accepted by the Faculty of Chemistry Jul. 2001, pp. 1-155.
International Search Report for Application No. PCT/KR2019/014453, dated Feb. 10, 2020, pp. 1-2.
Moumita Majumdar et al., Role of Axial Donors in the Ligand Isomerization Processes of Quadruply Bonded Dimolybdenum(II) Compounds, Inorganic Chemistry, Published on Web Feb. 2008, pp. 2212-2222, vol. 47, No. 6.
Silvana Rach, Development of new methods for the production of highly reactive polyisobutenes, Dissertation, Technischen Universität München, accepted by the Faculty of Chemistry Nov. 2010, pp. 1-195.
Kostjuk. S. et al., "Cationic Polymerization of Isobutylene at Room Temperature" Journal of Polymer Science, Polymer Chemistry, Feb. 2013, pp. 471-486, vol. 51, Issue 3.
Search Report dated Jul. 27, 2022 from the Office Action for Chinese Application No. 201980007988.5 dated Aug. 3, 2022, pp. 1-4.
Extended European Search Report including Written Opinion for Application No. 19888150.0 dated Apr. 12, 2021, pp. 1-7.

*Primary Examiner* — Catherine S Branch
(74) *Attorney, Agent, or Firm* — Lerner David LLP

(57) ABSTRACT

The present invention provides a method for preparing a polybutene oligomer including a step of oligomerizing a polymerization solution including a halogenated hydrocarbon solvent, a nonpolar hydrocarbon solvent and an isobutene monomer in the presence of an organometal catalyst.

18 Claims, No Drawings

METHOD FOR PREPARING POLYBUTENE OLIGOMER

CROSS-REFERENCE TO RELATED APPLICATIONS

The present application is a national phase entry under 35 U.S.C. § 371 of International Application No. PCT/KR2019/014453 filed Oct. 30, 2019, which claims priority from Korean Patent Application No. 10-2018-0145928 filed Nov. 23, 2018, all of which are incorporated herein by reference.

TECHNICAL FIELD

Technical Field

The present invention relates to a method for preparing a polybutene oligomer.

Background Art

Generally, in a process for preparing an oligomer or a polymer by the cationic polymerization of monomers, a propagating polymer chain includes an active moiety which has a positive charge. For example, the active moiety may be a carbenium ion (carbocation) or an oxonium ion.

As a catalyst or an initiator for such cationic polymerization, an aluminum- or boron-based Lewis acid is generally used. Examples of the Lewis acid catalyst include $AlX_3$, $BX_3$ (X=F, Br, Cl, I), etc., and the Lewis acid is a corrosive substance and produces halogen components such as HCl and HF during a quenching process, and this halogen components remain in a product to cause problems of degrading product quality. In addition, a Lewis acid catalyst requires a large amount of catalyst, and in order to remove the catalyst after reaction, a large amount of base (NaOH, KOH, $NH_4OH$, etc.) is used and additional washing with water is required and accordingly, a large amount of waste water is produced.

Meanwhile, examples of the monomer which is capable of undergoing cationic polymerization include styrene, isobutene, cyclopentadiene, dicyclopentadiene and the derivatives thereof, and typical examples include polyisobutene obtained by polymerizing isobutene.

Polyisobutene is classified into a low molecular weight, medium molecular weight and high molecular weight range according to the range of molecular weight. The low molecular weight polyisobutene has a number average molecular weight range of about 10,000 or less, and includes product groups of common polybutene and high reactive polybutene (HR-PB). The high reactive polybutene includes carbon-carbon double bonds mainly positioned at the terminal of the polybutene, and after introducing a functional group using a vinylidene functional group at the terminal (>80%), the high reactive polybutene oligomer is used as a fuel additive or an engine oil additive. In order to polymerize such high reactive polybutene, a boron-based catalyst such as $BF_3$ is used in the conventional technique, but this catalyst is toxic and has a gas type, and is difficult to handle. In addition, in order to increase reactivity and selectivity, a boron-alcohol or boron-ether composite is prepared and used, but there is a problem that the activity of the catalyst is reduced over time.

Meanwhile, according to a solvent-ligated organometal catalyst studied by professor Kuhn of Technical University of Munich (Macromol. Rapid Commun., vol. 20, no. 10, pp. 555-559), problems relating to the deterioration of product quality and corrosiveness due to the toxic component such as the conventional boron-based Lewis acid catalyst may be solved, but since the reaction time is fundamentally long and 16 hours for attaining high conversion ratio, structural isomerization is generated through the reaction of a portion of the product with the catalyst with the increased times, the exo-content is decreased, and the competitiveness is lower than the Lewis acid catalyst. Accordingly, the requirement on the development of an organometal catalyst resolving the above-described defects as a novel catalyst used for the preparation of an oligomer, specifically, polyolefin such as polyisobutene is present.

Under such background, the inventors of the present invention found that a polybutene oligomer having a low molecular weight could be efficiently prepared using a carbon-carbon organometal catalyst by using a novel organometal catalyst which is prepared by introducing a coordination solvent molecule and a bulky anion into a transition metal precursor with a paddle wheel structure, and completed the present invention.

PRIOR ART DOCUMENTS

Patent Document

Korean Registration Patent Publication No. 10-0486044 (Apr. 29, 2005)

Non-Patent Document

Macromol. Rapid Commun., vol. 20, no. 10, pp. 555-559 (Sep. 16, 1999)

DISCLOSURE OF THE INVENTION

Technical Problem

The present invention uses an organometal catalyst having a cation structure including a transition metal and a bulky borate-based anion structure and uses a mixture solvent to solve the limitations of the conventional Lewis acid catalyst, and accordingly, a polybutene oligomer which is capable of controlling the molecular weight of a product in a low range may be efficiently produced.

Particularly, an object is to provide a method for preparing a high reactive polybutene oligomer with the high exo-content.

Technical Solution

In order to control the number average molecular weight of polybutene to less than 10,000, particularly to a desired low molecular weight range, methods of controlling the reaction temperature of a oligomerization step, controlling the amount of a catalyst, or using a molecular weight controlling agent may be applied as the conventional techniques.

However, since the reaction is mainly conducted at room temperature due to the characteristics of the catalyst used in the present invention, there may be limits in controlling the molecular weight range by controlling the temperature. In addition, since most organometal catalysts of the present invention are expensive, economic burden may arise in controlling the amount of a catalyst. In addition, if a molecular weight controlling agent is added, such additive may remain in a final product to degrade its quality and to incur additional costs.

Accordingly, an embodiment of the present invention provides a method for preparing a polybutene oligomer including a step of oligomerizing a polymerization solution including a halogenated hydrocarbon solvent, a nonpolar hydrocarbon solvent and an isobutene monomer in the presence of an organometal catalyst represented by the following Formula 1:

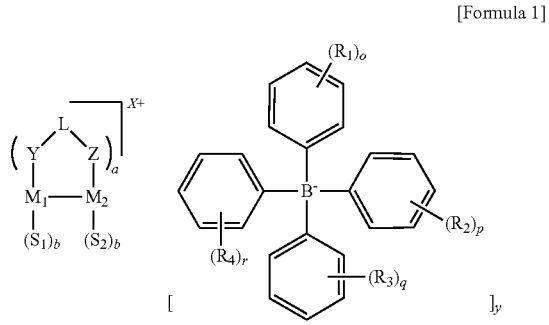

[Formula 1]

In Formula 1, $M_1$ and $M_2$ are each independently selected from transition metals in period 5 of groups 6 to 10 and transition metals in period 6 of groups 6 to 10, and the bond between $M_1$ and $M_2$ is any one among single to quadruple bonds according to an oxidation number of a metal, $S_1$ and $S_2$ are each independently a substituent which includes any one among oxygen, nitrogen, carbon and halogen atoms having one or more unshared electron pairs, where the unshared electron pairs of $S_1$ and $S_2$ make coordination bonds with $M_1$ and $M_2$, respectively, Y and Z are each independently selected from the group consisting of O, S, $N(R_m)$ and P, where $R_m$ is hydrogen, or a substituted or unsubstituted alkyl group of 1 to 10 carbon atoms, L is $C(R_n)$, where $R_n$ is hydrogen, a substituted or unsubstituted alkyl group of 1 to 20 carbon atoms, a substituted or unsubstituted aryl group of 6 to 20 carbon atoms, or a substituted or unsubstituted amine group, $R_m$ and $R_n$ may be combined with each other to form a heteroaryl group of 4 to 20 carbon atoms, $R_1$ to $R_4$ are each independently hydrogen, a halogen group, or a substituted or unsubstituted alkyl group of 1 to 20 carbon atoms, a is an integer of 0 to 3, b is an integer of 1 to 5, a+b is 4 or 5, o, p, q and r are each independently an integer of 1 to 5, and x and y are the same and an integer of 1 to 4.

Advantageous Effects

The method for preparing a polybutene oligomer of the present invention uses a mixture solvent including a halogenated hydrocarbon solvent and a nonpolar hydrocarbon solvent, and may control the molecular weight of a product to a low range and efficiently produce a polybutene oligomer, and in addition, toxicity due to the halogenated hydrocarbon solvent may be decreased.

In addition, according to the preparation method of the present invention, a catalyst is dissolved in a reaction product all the time and problems of arising structural isomerization reaction through the reaction with polybutene may be solved and a high reactive polybutene with the high exo-content may be stably obtained.

Also, according the preparation method of the present invention, the catalyst may be easily removed through simple filtering without performing a washing step of the oligomer, and problems of generating a large amount of waste water in the conventional washing method and problems of degrading the quality of a product due to the remaining of the catalyst may be solved.

BEST MODE FOR CARRYING OUT THE INVENTION

Hereinafter, the present invention will be described in more detail in order to assist the understanding of the present invention. It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The terms used herein are for the purpose of describing particular embodiments only and are not intended to limit the present invention. The singular forms are intended to include the plural forms as well, unless the context clearly indicates otherwise.

The term "composition" used in the present disclosure includes a mixture of materials including the corresponding composition as well as a reaction product and decomposition product formed from materials of the corresponding composition.

The term "oligomerization" used in the present disclosure means the oligomerization of olefin. According to the number of olefins polymerized, the oligomerization is called as trimerization, or tetramerization, and the generic term thereof is multimerization.

The term "oligomer" used in the present disclosure means a low polymer formed by oligomerizing a monomer and having a number average molecular weight in a range of less than 10,000.

The term "polymer" has relative concept to the oligomer and means a polymer compound formed by polymerizing a monomer and having a number average molecular weight of 10,000 or more.

The term "alkyl group" in the present invention may mean a monovalent aliphatic saturated hydrocarbon, and may include a linear alkyl group such as methyl, ethyl, propyl and butyl, and a branched alkyl group such as isopropyl, sec-butyl, tert-butyl and neo-pentyl.

The term "aryl group" in the present invention may mean a cyclic aromatic hydrocarbon, and may include both monocyclic aromatic hydrocarbon in which one ring is formed, and polycyclic aromatic hydrocarbon in which two or more rings are formed.

The term "allyl group" in the present invention means a substituent having a formula of $H_2C=CH-CH_2R$, where R means the remaining moiety of the substituent.

The terms "comprising", "including", and "having" and the derivatives thereof in the present invention, though these terms are particularly disclosed or not, do not intended to preclude the presence of optional additional components, steps, or processes. In order to avoid any uncertainty, all compositions claimed by using the term "comprising" may include optional additional additives, auxiliaries, or compounds, including a polymer or any other materials, unless otherwise described to the contrary. In contrast, the term "consisting essentially of ~" excludes unnecessary ones for operation and precludes optional other components, steps or processes from the scope of optional continuous description. The term "consisting of ~" precludes optional components, steps or processes, which are not particularly described or illustrated.

1. Preparation Method of Polybutene Oligomer

An embodiment of the present invention provides a method for preparing a polybutene oligomer, including a step of oligomerizing a polymerization solution including a halogenated hydrocarbon solvent, a nonpolar hydrocarbon solvent and an isobutene monomer in the presence of an organometal catalyst represented by Formula 1.

The method for preparing a polybutene oligomer of the present invention is characterized in performing a oligomerizing step by using a mixture solvent including a halogenated hydrocarbon solvent; and a nonpolar hydrocarbon solvent. In this case, effects of decreasing the toxicity of the halogenated hydrocarbon solvent may be achieved when compared to a case of using the halogenated hydrocarbon solvent alone.

In addition, the polarity of a solvent influences the reactivity during polymerizing the polybutene, and by controlling a dielectric constant of the mixture solvent by mixing the halogenated hydrocarbon solvent with the nonpolar hydrocarbon solvent, a polybutene oligomer in a low molecular weight range may be obtained.

In addition, in case of using only the nonpolar hydrocarbon solvent in the conventional technique, there are problems that a catalyst is dissolved in the reaction product all the time and reacts with polybutene to arise structural isomerization reaction. According to the present invention, the catalyst is hardly dissolved in the nonpolar hydrocarbon solvent in the mixture solvent, and the above-described problems may be solved and a high reactive polybutene having the high exo-content may be stably obtained.

In addition, in case of using the halogenated hydrocarbon solvent alone, the catalyst is partially dissolved in the halogenated hydrocarbon solvent, and the removal of the catalyst from the polybutene oligomer product may become difficult. For example, during removing the catalyst by filtering the polybutene oligomer thus obtained, in case of using the halogenated hydrocarbon solvent alone, the catalyst may be dissolved in a solvent and pushed out to arise problems of contaminating a filter. However, in case of using the mixture solvent of the present invention, the catalyst is hardly dissolved in the nonpolar hydrocarbon solvent and effects of decreasing filter contamination due to pushing phenomenon may be achieved, and thus, there is economic advantage of extending the life of a filtering column.

The weight ratio of the nonpolar hydrocarbon solvent and the halogenated hydrocarbon solvent in the mixture solvent may be 95:5 to 5:95, preferably, 85:15 to 15:85, 80:20 to 20:80, more preferably, 80:20 to 30:70, or 75:25 to 30:70.

If the weight ratio is satisfied, the control of the molecular weight of the polybutene oligomer thus produced may be easy, a polybutene oligomer having the high exo-content may be obtained, and the removal of the catalyst after the oligomerization reaction may also be easy.

If the halogenated hydrocarbon solvent or the nonpolar hydrocarbon solvent is not mixed, the controlling effect of the molecular weight of the polybutene oligomer may be unattainable, and the exo-content of the polybutene oligomer thus obtained may decrease. Accordingly, in order to prepare polybutene having a molecular weight of an appropriate degree and high exo-content, it is preferable that the above-mentioned weight ratio is satisfied, and if the weight ratio is optimized into a preferable range, the preparation of polybutene having high exo-content may be possible.

In addition, the halogenated hydrocarbon solvent may be one or more selected from the group consisting of chloromethane, dichloromethane, trichloromethane, 1-chlorobutane and chlorobenzene.

In addition, the nonpolar hydrocarbon solvent may be an aliphatic hydrocarbon solvent or an aromatic hydrocarbon solvent. For example, the aliphatic hydrocarbon solvent may be one or more selected from the group consisting of butane, pentane, neopentane, hexane, cyclohexane, methylcyclohexane, heptane, and octane, and the aromatic hydrocarbon solvent may be one or more selected from the group consisting of benzene, toluene, xylene, and ethylbenzene.

The step of oligomerizing of the present invention may be performed by a batch type or continuous type process. In case of the continuous type process, the mixture solvent may preferably include a halogenated hydrocarbon solvent and an aromatic hydrocarbon solvent. In case of the continuous type process, a reactive monomer and a polymer may be present together and the coupling phenomenon of the polybutene may be carried out. If the aromatic hydrocarbon solvent is included as the nonpolar solvent, such coupling phenomenon may be controlled and polybutene having the high exo-content may be obtained.

In the step of oligomerizing the isobutene monomer, the amount of the isobutene monomer may be 1 to 50 wt %, preferably, 5 to 25 wt % based on the total weight of the polymerization solution. In addition, the amount of the catalyst may be 0.005 to 1 wt %, preferably, 0.01 to 0.025 wt % based on the total weight of the polymerization solution. If the above-described numerical ranges are satisfied, the oligomerization reaction may be efficiently performed, but if excessive amounts from the numerical ranges are injected, polymerization efficiency may not much increased in contrast to the increase of the cost of raw materials.

The organometal catalyst used in the step of oligomerizing the isobutene monomer has merits of solving various problems of the conventional Lewis acid catalyst. For example, the conventional Lewis acid catalyst is corrosive but the organometal catalyst used in the present invention is not corrosive. In addition, the organometal catalyst of the present invention requires a small amount used for obtaining equivalent degree of effects, and the catalyst cost is saved.

Particularly, the organometal catalyst used in the present invention is represented by the following Formula 1:

[Formula 1]

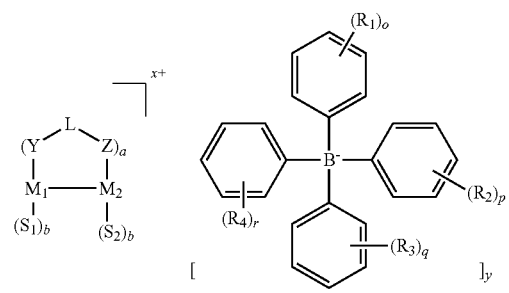

$M_1$ and $M_2$ are each independently selected from the transition metals in period 5 of groups 6 to 10 and the transition metals in period 6 of groups 6 to 10, for example, $M_1$ and $M_2$ may be selected from the group consisting of Mo, W, Re, Ru, Os, Rh, Pd and Pt, and the bond between $M_1$ and $M_2$ is any one among single to quadruple bonds according to the oxidation number of a metal.

$S_1$ and $S_2$ are each independently a substituent which includes any one among oxygen, nitrogen, carbon and halogen atoms having one or more unshared electron pairs, and the unshared electron pairs of $S_1$ and $S_2$ make coordination bonds with $M_1$ and $M_2$, respectively, Y and Z are each independently selected from the group consisting of O, S, $N(R_m)$ and P, where $R_m$ is hydrogen, or a substituted or unsubstituted alkyl group of 1 to 10 carbon atoms, L is $C(R_n)$, where $R_n$ is hydrogen, a substituted or unsubstituted alkyl group of 1 to 20 carbon atoms, a substituted or unsubstituted aryl group of 6 to 20 carbon atoms, or a substituted or unsubstituted amine group, $R_m$ and $R_n$ may be combined with each other to form a heteroaryl group of 4 to 20 carbon atoms, $R_1$ to $R_4$ are each independently hydrogen, a halogen group, or a substituted or unsubstituted alkyl group of 1 to 20 carbon atoms, a is an integer of 0 to 3, b is an integer of 1 to 5, a+b is 4 or 5, o, p, q and r are each independently an integer of 1 to 5, and x and y are the same and an integer of 1 to 4.

In an embodiment, $S_1$ and $S_2$ are each independently a halogen group; or a coordination solvent molecule including a functional group selected from the group consisting of a cyano group, an isocyano group, an ether group, a pyridine group, an amide group, a sulfoxide group and a nitro group, $R_1$ to $R_4$ are each independently hydrogen, a halogen group, or a substituted or unsubstituted alkyl group of 1 to 20 carbon atoms, and preferably, an alkyl group of 1 to 12 carbon atoms, which is substituted with a halogen group, more preferably, an alkyl group of 1 to 4 carbon atoms, which is substituted with a halogen group, $R_n$ is hydrogen, a substituted or unsubstituted alkyl group of 1 to 20 carbon atoms, a substituted or unsubstituted aryl group of 6 to 20 carbon atoms, or a substituted or unsubstituted amine group, preferably, hydrogen, a substituted or unsubstituted alkyl group of 1 to 12 carbon atoms, an aryl group of 6 to 12 carbon atoms, or a substituted or unsubstituted amine group, and $R_m$ and $R_n$ may be combined with each other to form a heteroaryl group of 4 to 12 carbon atoms.

In an embodiment, $S_1$ and $S_2$ may be halogen groups; or one or more selected from the group consisting of acetonitrile, propionitrile, 2-methylpropanenitrile, trimethylacetonitrile, benzonitrile, dialkyl ether, for example, diethyl ether and diallyl ether, pyridine, dimethylformamide, dimethyl sulfoxide, nitromethane, nitrobenzene and the derivatives thereof, and may be coordination solvent molecules of which unshared electron pairs of oxygen, nitrogen or carbon make coordination bonds with $M_1$ and $M_2$.

In the organometal catalyst, the borate-based bulky anion may be one or more selected from the group consisting of tetrakis(phenyl)borate, tetrakis(pentafluorophenyl)borate, tetrakis[3,5-bis(trifluoromethyl)phenyl]borate, and the derivatives thereof.

In an embodiment, if the metal is molybdenum and the bulky anion is tetrakis(pentafluorophenyl)borate, the organometal catalyst of the present invention may be one or more selected from the group consisting of the compounds represented by the formulae below.

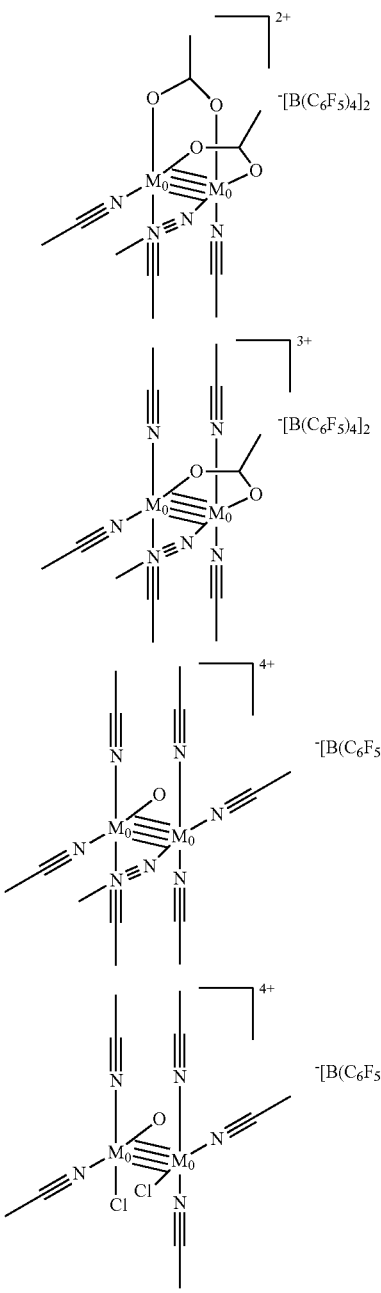

In the method for preparing a polybutene oligomer of the present invention, a step for removing the organometal catalyst by washing a oligomerized product is not separately conducted after performing the step of oligomerizing. Instead, the catalyst may be easily removed by filtering the oligomerized product.

The filtering may be performed using a filter including one or more selected from the group consisting of porous materials, for example, celite, silica, zeolite and alumina. In this case, the catalyst is thought to be filtered through an absorption principle of the porous material, etc. Accordingly, in case of using a glass fiber or a filter having a minute pore size, catalyst filtering efficiency may be degraded.

The method for preparing a polybutene oligomer of the present invention may further include a step of drying remaining solvents after the filtering step.

For example, the drying temperature may be 30 to 200° C., or 40 to 150° C., and the vacuum degree may be 300 torr or less, 200 torr or less, or 100 torr or less. Hereby, a desired polybutene oligomer may be efficiently obtained. In addition, the drying method is not specifically limited and may be conducted by common methods.

In addition, in the method for preparing a polybutene oligomer of the present invention, a step of drying a halogenated hydrocarbon solvent may be separately conducted or not after performing the step of oligomerizing and prior to filtering. In case of conducting the drying step, the drying conditions may be the same as described above, without specific limitation.

In case of separately conducting the drying step of the halogenated hydrocarbon solvent, there are advantages of obtaining a polybutene oligomer with even higher purity. However, according to the present invention, the catalyst may be easily removed through simple filtering as described above, and a separate drying step of the halogenated hydrocarbon solvent after the step of oligomerizing and prior to filtering, may be omitted, and there are advantages of simplifying processes.

2. Polybutene Oligomer

Another embodiment of the present invention provides a polybutene oligomer prepared according to the method for preparing a polybutene oligomer.

The oligomerizing step may be conducted by a batch type or continuous type in the present invention, and the number average molecular weight range and polydispersity (PDI) of the polybutene oligomer obtained may be different according to the process.

For example, the number average molecular weight of the polybutene oligomer may be 5,500 or less, or 4,500 or less, or 4,200 or less, or 3,900 or less, or 3,500 or less, and 500 or more, or 750 or more, or 1000 or more, or 1200 or more.

In addition, the polydispersity (PDI) of the oligomer may be 1.5 to 3.0, or 1.8 to 2.5.

In addition, the exo-content of the polybutene oligomer prepared by the preparation method may be 50 to 99%, preferably, 74 to 99%, preferably, 80 to 99%, preferably, 89 to 98%, preferably, 94 to 98%. The exo-content represents a case where a carbon-carbon double bond is positioned at the terminal of a polyolefin, and if the exo-content increases, it means that high reactive polyolefin, for example, high reactive polybutene (HR-PB) is produced well.

If the reaction time for oligomerizing using the catalyst is increased, the exo-content tends to decrease due to the structural isomerization reaction of the polybutene. This is a limit generated due to the reaction with the polybutene oligomer because the catalyst is dissolved in the reaction product all the time. However, according to the preparation method of the present invention, a mixture solvent of the halogenated hydrocarbon solvent and the nonpolar hydrocarbon solvent is used, and the dissolution phenomenon of the catalyst in the solvent may decrease. Accordingly, the limit of decreasing the exo-content as described above may be solved.

Hereinafter, embodiments of the present invention will be described in detail so as to assist the understanding of the present invention. However, the embodiments below are only illustrations, and the invention may be changed and modified in many different forms and should not be construed as being limited to the embodiments set forth herein, and such change and modification should be included in attached claims.

EXAMPLES

Preparation Example 1

<Preparation of Organometal Catalyst>

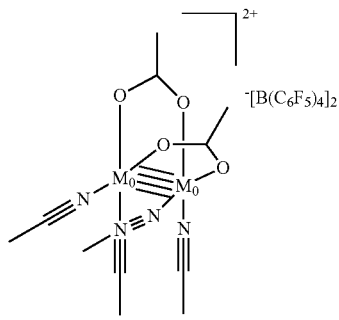

Under an argon atmosphere in a glove box, 100 mg of molybdenum(II) acetate ($Mo_2C_8H_{16}O_8$) was put in 2 ml of acetonitrile and stirred into a dispersion type. 2 equivalents of $[Et_3Si][B(C_6F_5)_4]$ (386 mg) (purchased from Asahi Glass Co.) of the metal precursor was dissolved in 2 ml of acetonitrile and was added to the molybdenum(II) acetate under stirring. Then, stirring was performed further at room temperature for 5 hours. After removing all solvents in vacuum, the remaining solid was washed with hexane three times and dried in vacuum to obtain a $[Mo_2(OAc)_2(MeCN)_4][B(C_6F_5)_4]_2$ catalyst (quantitative yield).

Selected IR (KBr): $vCN=2317, 2285$ $cm^{-1}$; elemental analysis calcd (%) for $C_{64}H_{26}B_2F_{40}Mo_2N_6O_4$: C 40.11, H 1.37, N, 4.39. Found: C, 39.91; H, 1.29; N, 4.31.

Example 1

<Polymerization of Polybutene-Batch Type Reaction>

An andrew glass pressure reactor from which moisture and oxygen were removed was prepared. 20 g of isobutylene was injected through a line connected with an isobutylene bombe and a andrew glass. A mixture solvent of 20 ml of hexane and 60 ml of dichloromethane (DCM) was used as a solvent after storing in molecular sieve to remove moisture, and was injected after calculating monomer concentration in the reactant (total solution for compound, TSC) from the top of the andrew glass using a syringe. After finishing the injection of the solvent and the monomer, the Andrew glass was moved into a water bath, and the temperature was set to the polymerization temperature of 30° C.

0.01 wt % of the catalyst of Preparation Example 1 stored at a low temperature in a glove box was weighed based on the total weight of the monomer and dissolved in a DCM solvent. The resultant solution was transported to a pressure syringe and moved out of the glove box. To a reactor, argon was pressurized to 2 or 3 bar, and the catalyst was injected. From the moment of injecting the catalyst as the reaction starting point, oligomerization reaction was carried out to proceed the reaction until the pressure became 0 bar or for 2 hours. After finishing the reaction, a valve at the top of the andrew glass was opened, remaining unreacted isobutylene was removed, and the andrew glass was opened to recover a polymer and a solvent. The remaining solvents of the recovered solution was removed through a rotary evaporator and a polymer was obtained.

Examples 2 to 6, and Comparative Examples 1 to 4

Butene oligomers of Examples 2 to 6, and Comparative Examples 1 to 4 were prepared by using the catalyst of Preparation Example 1 and changing solvent amount conditions as shown in Table 1 below. In addition, as Comparative Example 3, boron trifluoride diethyl etherate (BF$_3$DEE) of Aldrich Co. was purchased and used.

Example 7

<Polymerization of Polybutene-Continuous Type Reaction>

A reactor was sufficiently purged with argon to remove moisture and oxygen. The remaining amount was checked if isobutylene and solvents were sufficiently prepared, and solvents were set to be continuously injected in a ratio of 33 wt % of hexane and 67 wt % of DCM.

0.01 wt % of the catalyst of Preparation Example 1 stored at a low temperature in a glove box was weighed based on the total weight of the monomer, put in an andrew glass, dissolved in DCM and transported to a catalyst tank. The isobutylene and solvents were injected into the reactor, and at the same time, the catalyst was injected into the reactor. After securing if the catalyst and raw materials were injected well, the recording of the reaction initiation time was started. A gear pump at the rear of the reactor and a back-pressure regulator (BRP) were controlled to maintain a reactor level in line with a preset retention time. After achieving stabilization, a sample was taken, and solvents were removed to obtain a polymer.

Examples 8 and 9, and Comparative Examples 5 to 7

Butene oligomers of Examples 8 and 9, and Comparative Examples 5 to 7 were prepared by using the catalyst of Preparation Example 1 and changing solvent amount conditions as shown in Table 2 below.

Experimental Example 1

<Exo-Content and Number Average Molecular Weight>

The exo-content and number average molecular weight value of the polybutene oligomers thus obtained were measured as follows and shown in Table 1.

① exo-content: exo-olefin and endo-olefin types were secured according to the position of a double bond by measuring 1H NMR using 500 MHz NMR (Varian Co.), and the exo-content (%) was calculated according to the following equation:

exo-content (%)=(exo-olefin content where carbon-carbon double bond is positioned at terminal/total content of exo-olefin and endo-olefin obtained)×100

② Number average molecular weight: the oligomers thus produced were measured under the following gel permeation chromatography (GPC) analysis conditions:
Column: PL MiniMixed B×2
Solvent: THF
Flow rate: 0.3 ml/min
Specimen concentration: 2.0 mg/ml
Injection amount: 10 µl
Column temperature: 40° C.

Detector: RI detector (Agilent Co.)
Standard: polystyrene (corrected by a cubic function)
Data processing: ChemStation

TABLE 1

| Division | Catalyst | Hydrocarbon solvent Kind | Hydrocarbon solvent Content (wt %) | DCM (wt %) | Exo-content (%) | Mn |
|---|---|---|---|---|---|---|
| Example 1 | Preparation Example 1 | Hexane | 33.3 | 66.7 | 93 | 5,310 |
| Example 2 | Preparation Example 1 | Hexane | 50 | 50 | 92 | 3,920 |
| Example 3 | Preparation Example 1 | Hexane | 66.7 | 33.3 | 93 | 2,240 |
| Example 4 | Preparation Example 1 | Toluene | 25 | 75 | 88 | 4,250 |
| Example 5 | Preparation Example 1 | Toluene | 50 | 50 | 90 | 2,600 |
| Example 6 | Preparation Example 1 | Toluene | 75 | 25 | 92 | 2,950 |
| Comparative Example 1 | Preparation Example 1 | Hexane | 0 | 100 | 56 | 7,040 |
| Comparative Example 2 | Preparation Example 1 | Hexane | 100 | 0 | N.R* | N.R |
| Comparative Example 3 | BF$_3$DEE | Hexane | 50 | 50 | 32 | 210 |
| Comparative Example 4 | Preparation Example 1 | Toluene | 100 | 0 | 95 | 1,500 |

*The wt % of the hydrocarbon solvent and DCM represents % regarding the sum of the two solvents as 100.
*N.R (No Reaction): Reaction was not performed Referring to Table 1, from the results of Examples 1 to 6, it could be confirmed that a polybutene oligomer having a low molecular weight and high exo-content was obtainable by using a mixture solvent of a halogenated hydrocarbon solvent and a nonpolar hydrocarbon solvent if performed by a batch type process. Particularly, the exo-content was at least 91%, and the number average molecular weight was in a range of 5,500 or less.

On the contrary, Comparative Example 1 corresponds to a case of using a DCM solvent solely, and since the catalyst was dissolved in the solvent all the time, a portion of the product reacted with the catalyst to generate structural isomerization phenomenon, and a polybutene oligomer having the low exo-content was considered to be obtained. In addition, according to Comparative Example 1, the number average molecular weight was greater than 5,500, and a polybutene oligomer having a higher molecular weight than the Examples was obtained.

Meanwhile, Comparative Example 2 corresponded to a case of using hexane only as the solvent, and oligomerization was not smooth and a polybutene oligomer was not obtained. In case of Comparative Example 4 using toluene only, the reaction was completed but a conversion ratio was significantly low and a substantially valid polybutene oligomer was not obtained.

In addition, in case of Comparative Example 3, the reaction was not controlled but explosively carried out in the same temperature conditions (room temperature) as in Example 1, and the exo-content was significantly small and the molecular weight was small, and thus, a normal polybutene oligomer could not be obtained. Meanwhile, though polymerization was performed using the catalyst of Comparative Example 3 at a low temperature in a range of −30~0° C., the control of the reaction was not easy, and the catalyst was required to be formed into a complex or the polymerization was required to be performed at a further extremely low temperature state. Accordingly, energy consumption thereby was expected to be severe, and it is expected that an oligomer having a molecular weight of an appropriate degree and high exo-content as in the present invention could not be produced.

TABLE 2

|  | Catalyst | Hydrocarbon solvent | | DCM (wt %) | exo-content (%) | Mn |
|---|---|---|---|---|---|---|
|  |  | Kind | Content (wt %) |  |  |  |
| Example 7 | Preparation Example 1 | Hexane | 33 | 67 | 90 | 3,370 |
| Example 8 |  | Toluene | 33 | 67 | 92 | 3,310 |
| Example 9 |  | Hexane | 60 | 40 | 92 | 2,490 |
| Comparative Example 5 |  | — | 0 | 100 | 59 | 4,530 |
| Comparative Example 6 |  | Hexane | 100 | 0 | — | — |
| Comparative Example 7 |  | Toluene | 100 | 0 | 90 | 1,500 |

Referring to Table 2, from the results of Examples 7 to 9, it could be confirmed that a polybutene oligomer having a low molecular weight and high exo-content was obtainable by using a mixture solvent of a halogenated hydrocarbon solvent and a nonpolar hydrocarbon solvent if performed by a continuous type process. Particularly, an oligomer having the exo-content of at least 90%, and a lower molecular weight range when compared to the batch process of Examples 1 to 6, was obtained. Particularly, Examples 7 and 8 were cases in which the mixing ratio of the halogenated hydrocarbon solvent and the nonpolar hydrocarbon solvent was about 2:1, and the number average molecular weight was maximally 3,370. Meanwhile, in case of Comparative Example 5 using only DCM, very low exo-content was shown. In addition, in case of Comparative Example 6 using only hexane, the oligomerizing reaction was not performed smoothly, and a polybutene oligomer was not obtained. In case of Comparative Example 7 using only toluene, the conversion ratio was low and accordingly, a substantially valid polybutene oligomer was not obtained.

Experimental Example 2

<Removal of Catalyst from Polymerized Polybutene>

In Examples 3, 5 and 9, the reaction solution after performing the oligomerization reaction was passed as it was without removing residual solvents, through columns including celite, silica, zeolite and glass fiber as shown in Table 3 below, respectively.

With respect to cases of performing filtering by passing through four columns for Examples 3, 5 and 9, and cases of not performing filtering for Examples 3, 5 and 9 and Comparative Example 1, analysis was performed according to the methods below, and the results are shown in Table 3 below.

1) F analysis: measured under the following conditions using combustion IC (ICS-2100/AQF-5000, Thermo Scientific Dionex):

Column: IonPac AS18 analytical (4×250 mm), IonPac AG18 guard (4×50 mm)
Eluent kind: KOH (30.5 mM)
Eluent flow rate: 1 mL/min
Detector: Suppressed Conductivity Detector
SRS Current: 76 mA
Injection Volume: 20 μl
Isocratic/Gradient conditions: Isocratic

TABLE 3

| Polymerization method | Filtering method | | | | Elemental (F) analysis results [mg/kg] |
|---|---|---|---|---|---|
|  | Celite | Silica | Zeolite | Glass fiber |  |
| Example 3 | o | x | x | x | <10 |
|  | x | o | x | x | <10 |
|  | x | x | o | x | <10 |
|  | x | x | x | o | 49 |
|  | x | x | x | x | 48 |
| Example 5 | o | x | x | x | <10 |
|  | x | o | x | x | <10 |
|  | x | x | o | x | <10 |
|  | x | x | x | o | 35 |
|  | x | x | x | x | 35 |
| Example 9 | o | x | x | x | <10 |
|  | x | o | x | x | <10 |
|  | x | x | o | x | <10 |
|  | x | x | x | o | 39 |
|  | x | x | x | x | 40 |
| Comparative Example 1 | x | x | x | x | 47 |

From the results, it could be confirmed that the catalyst could be easily removed by performing filtering with respect to the reaction solution after performing the oligomerizing step of the present invention. Particularly, it was confirmed that if filtering was performed with columns including celite, silica and zeolite for Examples 3, 5 and 9, a trace amount of F element component was detected, and thus, the catalyst was removed well.

Meanwhile, if filtering was not performed for Examples 3, 5 and 9 and Comparative Example 1, it was confirmed that F element component was detected to a certain degree or more, and the catalyst was remained. In addition, in case of using a column including glass fiber, similar degree of F element component was detected as in the case of not performing filtering, and accordingly, it could be confirmed that the filtering was not performed well.

The invention claimed is:
1. A method for preparing a polybutene oligomer, the method comprising:
a step of oligomerizing a polymerization solution comprising a halogenated hydrocarbon solvent, a nonpolar hydrocarbon solvent and an isobutene monomer, in the presence of an organometal catalyst represented by the following Formula 1:

[Formula 1]

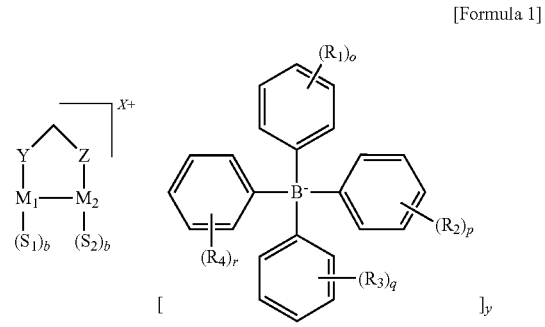

in Formula 1,
$M_1$ and $M_2$ are each independently selected from transition metals in period 5 of groups 6 to 10 and transition metals in period 6 of groups 6 to 10, where a bond between $M_1$ and $M_2$ is any one among single to quadruple bonds according to an oxidation number of a metal, $S_1$ and $S_2$ are each independently a substituent which includes any one among oxygen, nitrogen, carbon and halogen atoms having one or more unshared electron pairs, where the unshared electron pairs of $S_1$ and $S_2$ make coordination bonds with $M_1$ and $M_2$, respectively, Y and Z are each independently selected from the group consisting of O, S, $N(R_m)$ and P, where $R_m$ is hydrogen, or a substituted or unsubstituted alkyl group of 1 to 10 carbon atoms, L is $C(R_n)$, where $R_n$ is hydrogen, a substituted or unsubstituted alkyl group of 1 to 20 carbon atoms, a substituted or unsubstituted aryl group of 6 to 20 carbon atoms, or a substituted or unsubstituted amine group, $R_m$ and $R_n$ are optionally combined with each other to form a heteroaryl group of 4 to 20 carbon atoms, $R_1$ to $R_4$ are each independently hydrogen, a halogen group, or a substituted or unsubstituted alkyl group of 1 to 20 carbon atoms, a is an integer of 0 to 3, b is an integer of 1 to 5, a+b is 4 or 5, o, p, q and r are each independently an integer of 1 to 5, and x and y are the same and an integer of 1 to 4.

2. The method for preparing a polybutene oligomer according to claim 1, wherein a weight ratio of the nonpolar hydrocarbon solvent and the halogenated hydrocarbon solvent is 85:15 to 15:85.

3. The method for preparing a polybutene oligomer according to claim 1, wherein the halogenated hydrocarbon solvent is one or more selected from the group consisting of chloromethane, dichloromethane, trichloromethane, 1-chlorobutane and chlorobenzene.

4. The method for preparing a polybutene oligomer according to claim 1, wherein the nonpolar hydrocarbon solvent is one or more selected from the group consisting of butane, pentane, neopentane, hexane, cyclohexane, methylcyclohexane, heptane, octane, benzene, toluene, xylene, and ethylbenzene.

5. The method for preparing a polybutene oligomer according to claim 1, wherein the step of oligomerizing is performed by a batch type or continuous type process.

6. The method for preparing a polybutene oligomer according to claim 1, further comprising a step of removing the organometal catalyst by filtering an oligomerized product.

7. The method for preparing a polybutene oligomer according to claim 6, wherein the filtering is performed with a filter comprising one or more selected from the group consisting of celite, silica, zeolite and alumina.

8. The method for preparing a polybutene oligomer according to claim 6, wherein a step of drying the halogenated hydrocarbon solvent is not performed after the step of oligomerizing and prior to the filtering.

9. The method for preparing a polybutene oligomer according to claim 1, wherein a step of washing an oligomerized product to remove the organometal catalyst is not performed.

10. The method for preparing a polybutene oligomer according to claim 1, wherein $M_1$ and $M_2$ are each independently selected from the group consisting of Mo, W, Re, Ru, Os, Rh, Pd and Pt, $S_1$ and $S_2$ are each independently a halogen group; or a coordination solvent molecule comprising a functional group selected from the group consisting of a cyano group, an isocyano group, an ether group, a pyridine group, an amide group, a sulfoxide group and a nitro group;

$R_1$ to $R_4$ are each independently hydrogen, a halogen group, or a substituted alkyl group of C1-C12 with a halogen group, $R_n$ is hydrogen, a substituted or unsubstituted alkyl group of 1 to 12 carbon atoms, an aryl group of 6 to 12 carbon atoms, or a substituted or unsubstituted amine group, and $R_m$ and $R_n$ are optionally combined with each other to form a heteroaryl group of 4 to 12 carbon atoms.

11. The method for preparing a polybutene oligomer according to claim 1, wherein the borate-based bulky anion of the organometal catalyst represented by Formula 1 is one or more selected from the group consisting of tetrakis(phenyl)borate, tetrakis(pentafluorophenyl)borate, tetrakis[3,5-bis(trifluoromethyl)phenyl]borate, and the derivatives thereof.

12. The method for preparing a polybutene oligomer according to claim 1, wherein a number average molecular weight of the polybutene oligomer produced by the oligomerization is 500 to 5,500.

13. The method for preparing a polybutene oligomer according to claim 1, wherein the step of oligomerizing is performed by a continuous type process, and the nonpolar hydrocarbon solvent is an aromatic hydrocarbon solvent.

14. The method for preparing a polybutene oligomer according to claim 1, wherein the isobutene monomer is included in an amount of 1 to 50 wt %, and the organometal catalyst is included in an amount of 0.005 to 1 wt %, based on the total weight of the polymerization solution.

15. The method for preparing a polybutene oligomer according to claim 1, wherein $S_1$ and $S_2$ are each independently a halogen group; or one or more selected from the group consisting of acetonitrile, propionitrile, 2-methylpropanenitrile, trimethylacetonitrile, benzonitrile, dialkyl ether, for example, diethyl ether and diallyl ether, pyridine, dimethylformamide, dimethyl sulfoxide, nitromethane, nitrobenzene and the derivatives thereof.

16. The method for preparing a polybutene oligomer according to claim 1, wherein the organometal catalyst is one or more selected from the group consisting of the compounds represented by the formulae below:

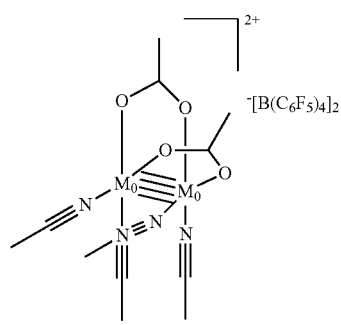

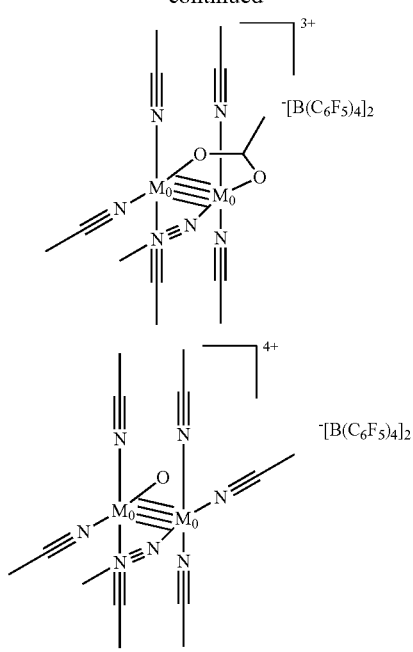
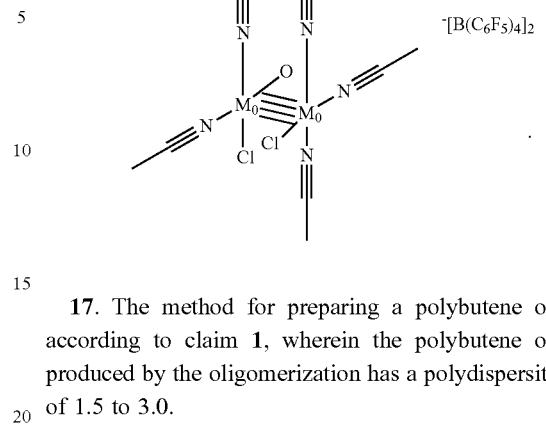
17. The method for preparing a polybutene oligomer according to claim 1, wherein the polybutene oligomer produced by the oligomerization has a polydispersity (PDI) of 1.5 to 3.0.
18. The method for preparing a polybutene oligomer according to claim 1, wherein the polybutene oligomer produced by the oligomerization has an exo-content of 50 to 99%.
* * * * *